(12) United States Patent
Ionescu (10) Patent No.: US 8,687,300 B2
(45) Date of Patent: Apr. 1, 2014

(54) COMMUNICATION PATH LATENCY MEASUREMENT USING CAPACITIVE COUPLING

(75) Inventor: Stefan Andrei Ionescu, Burnsville, MN (US)

(73) Assignee: Seagate Technology LLC, Cupertino, CA (US)

( * ) Notice: Subject to any disclaimer, the term of this patent is extended or adjusted under 35 U.S.C. 154(b) by 148 days.

(21) Appl. No.: 13/353,518

(22) Filed: Jan. 19, 2012

(65) Prior Publication Data

US 2013/0188274 A1 Jul. 25, 2013

(51) Int. Cl.
*G11B 27/36* (2006.01)
*G11B 5/02* (2006.01)

(52) U.S. Cl.
USPC .................................. 360/31; 360/67; 360/68

(58) Field of Classification Search
None
See application file for complete search history.

(56) References Cited

U.S. PATENT DOCUMENTS

| | | | |
|---|---|---|---|
| 6,014,281 A * | 1/2000 | Contreras | 360/67 |
| 7,151,654 B1 | 12/2006 | Mao et al. | |
| 7,876,517 B2 * | 1/2011 | Buch et al. | 360/51 |
| 8,054,122 B2 * | 11/2011 | Guo | 327/333 |
| 8,400,891 B2 * | 3/2013 | Gubbins | 369/47.28 |
| 2005/0232066 A1 * | 10/2005 | Ishibashi et al. | 365/233 |

* cited by examiner

*Primary Examiner* — Daniell L Negron
(74) *Attorney, Agent, or Firm* — Mueting Raasch & Gebhardt PA (57) ABSTRACT

Systems and/or methods for measuring latency in an electronic device such as, e.g., a storage device, may include coupling circuitry configured to capacitively couple an outbound or write data path to an inbound or read data path. A latency measurement signal may be driven on the write data path, the coupling circuitry may transmit at least a portion of the latency measurement signal from the write data path to the read data path, and the latency measurement signal may be sensed on the read data path to be used to determine communication path latency in the device.

17 Claims, 10 Drawing Sheets

COMMUNICATION PATH LATENCY MEASUREMENT USING CAPACITIVE COUPLING

The disclosure herein relates to measuring latency in a communication path (e.g., read and write paths) within electronic devices including, e.g., a storage device (e.g., a hard disk drive, etc.), and further to devices for performing and implementing the latency measurement.

SUMMARY

The present disclosure relates to measuring the latency in a communication path within a storage device (e.g., a hard disk drive, etc.), and further to devices for performing and implementing the latency measurement. In at least one embodiment, a write path and a read path in a storage path may be capacitively coupled such that a latency measurement signal may couple the write and the read paths and be used to measure the latency of the write and read paths.

One exemplary system (e.g., bit-patterned media systems, a heat-assisted magnetic recording systems, etc.) for measuring communication path latency in a an electronic device may include data communication component such as, e.g., a head, configured to write and data on a storage medium, a controller configured to write and read data using the data communication component, a write data path electrically coupling the controller to the data communication component for transmission of write data signals from the controller to the data communication component, and a read data path electrically coupling the controller to the data communication component for transmission of read data signals from the data communication component to the controller. The exemplary system may further include coupling circuitry configured to capacitively couple the write data path and the read data path (e.g., when a latency measurement signal is driven on the write data path), and the controller may be configured to determine a latency of a communication path including at least a portion of each of the write data path and the read data path using at least a latency measurement signal driven on the write data path. In at least one embodiment, the controller may be configured to drive the latency measurement signal on the write data path and sense the latency measurement signal on the read data path, e.g., for use in determining the latency of the communication path.

Another exemplary system for measuring communication path latency in an electronic device (e.g., such as a storage device) may include a controller configured to write and read data, e.g., on a storage medium, using a plurality of heads (or any other data communication components) and a preamplifier located between the controller and the plurality of heads. The preamplifier may be configured to amplify the write data signals transmitted from the controller to the plurality of heads and the read data signals transmitted from the plurality of heads to the controller. The exemplary system may further include a common write data path electrically coupling the controller to the preamplifier for transmission of write data signals from the controller to the preamplifier, a common read data path electrically coupling the controller to the preamplifier for transmission of read data signals from the preamplifier to the controller, and coupling circuitry located in the preamplifier configured to capacitively couple the common write data path to the common read data path (e.g., when a latency measurement signal is driven on the write data path). The controller may be configured to determine a latency of a communication path including at least each of the common write data path and the common read data path using at least the latency measurement signal driven on the common write data path.

One exemplary method for use in measuring communication path latency in an electronic device (e.g., a storage device including a write data path for the transmission of write data signals and a read data path for the transmission of read data signals extending between a controller and a head) may include providing coupling circuitry configured to capacitively couple a write data path to a read data path when a latency measurement signal is driven on the write data path, driving a latency measurement signal on the write data path (e.g., transmitting a square wave on the write data path) through the coupling circuitry and on the read data path, sensing the latency measurement signal on the read data path, and determining the latency of a communication path including at least a portion of each of the write data path and read data path using at least the sensed latency measurement signal.

Another exemplary system for measuring latency may include an outbound data path, an inbound data path, and coupling circuitry. Each data path may electrically couple a controller to a data communication component (e.g. a head), and the controller may be configured to manage the outbound data path and the inbound data path. The coupling circuitry may be configured to capacitively couple the outbound data path and the inbound data path. The controller may be further configured to determine a latency of a communication path including at least a portion of each of the outbound data path and the inbound data path using at least a latency measurement signal driven on at least one of the outbound data path and the inbound data path.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Many storage systems and communication systems experience latencies in the electronics or other portions of the systems. More specifically, signals are processed and passed through various electronics and wireless or wired communication links. A specific, or determined, amount of time is associated with the signals traveling on such paths, which may be beneficial when precise measurements or positioning is required.

Latency occurs in a communication path, or the write-read path, in a storage system (e.g., a magnetic storage system). For example, a hard disk drive (HDD) manages a large capacity of information being written to and retrieved from a storage medium controlled by the drive. A HDD includes input/output interfaces, read and write head components, encoding and decoding components, and servo mechanisms that appropriately position read/write heads over the storage medium. These interfaces, components, and mechanisms are controlled by integrated circuits, which perform signal processing, encoding, and decoding, and further control the operation of a given head as it writes data to and retrieves data from the storage medium.

Such systems may use positioning by reference to the read location in order to determine the correct write location, which uses adjustment between the read location to account for the small distance between the read head and the write head for the write operation. In addition to the actual distance, the latency due to the electronics may also be taken into account.

One example of the type of system in which such a positioning technique may be employed is a system that is based upon Bit Patterned Media (BPM). In a storage device that uses BPM, a single domain is provided in a predefined magnetic island per bit, instead of the conventional multiple grains of magnetic material per bit found in continuous recording. The single domain feature of BPM may allow for higher areal density by reducing some of the constraints of continuous recording.

A key requirement for the BPM applications is to guarantee that the write current transitions occur exactly on top of the media dot. Thus, the timing of the write clock must be controlled, which may require calculations including the phase difference between the reader and the writer based upon a known read location. This phase difference consists of several components, a principal component being the round trip latency in the communication path, or the write and read paths.

Many of the electronics in the read and write electronics, such as the preamplifier chip, may be highly temperature sensitive and voltage sensitive. Further, such electronics may also be impacted by various environmental conditions such as, e.g., humidity. Thus, the latency of the communication path may be due, in part, to the latency of the electronics, which vary with temperature, voltage and/or environmental conditions. Thus, the communication path latency may be periodically recalibrated to account for the varying, or changing, environmental conditions.

Electrical latency can be measured by using a number of resistors and switches to connect either the write transducer to the read transducer in the head, or the write driver to the read input stage in the preamplifier portion, which is referred to herein as "DC loop-back connectivity." Since the DC loop-back connectivity provides a direct connection between a write path and a read path, all frequencies and/or components of signals driven onto the write path may be transmitted to the read path. Further, this DC loop-back connectivity from the writer to the reader could either be applied to each head in the drive or to some dedicated head with the exclusive purpose of facilitating the round trip delay measurement. In either case, head technology incorporating such switches would need to be developed.

Storage systems often use asymmetrical power supplies. For example, in a system where the preamp uses +5V/−3V, the write driver may typically use the entire 8V headroom for performance reasons, and therefore, the common mode for the selected write head is typically +1V.

The present disclosure generally relates to "AC loop-back connectivity" for use in latency measurement of a communication path. For example, exemplary systems/methods may utilize coupling circuitry configured to capacitively couple a write data path (or outbound data path) to a read data path (or inbound data path) such that a latency measurement signal may be transmitted from the write data path (or outbound data path) to the read data path (or inbound data path) through the coupling circuitry. The coupling circuitry is described as "capacitively coupling" a write data path to a read data path because, e.g., it may allow high frequency components but not allow low frequency components of a signal to pass therethrough. While the present disclosure is not so limited, an appreciation of various aspects of the disclosure will be gained through a discussion provided below.

Exemplary systems, methods, and devices shall be described with reference to FIGS. 1-10. It will be apparent to one skilled in the art that elements or processes from one embodiment may be used in combination with elements or processes of the other embodiments, and that the possible embodiments of such systems, methods, and devices using combinations of features set forth herein is not limited to the specific embodiments shown in the figures and/or described herein. Further, it will be recognized that timing of the processes and the size and shape of various elements herein may be modified but still fall within the scope of the present disclosure, although certain timings, one or more shapes and/or or sizes, or types of elements, may be advantageous over others.

An exemplary hard disk drive (HDD) may be used with the exemplary methods and systems described herein. The HDD may include a flex assembly and electrical traces to provide electrical connection paths, an associated controller, preamps, an actuator assembly, read/write heads, etc. The flex assembly may include a printed circuit board that may, e.g., typically include circuitry for controlling the write currents applied to the heads during a write operation and a preamplifier for biasing and amplifying read signals generated by the heads during a read operation.

Figure 1:
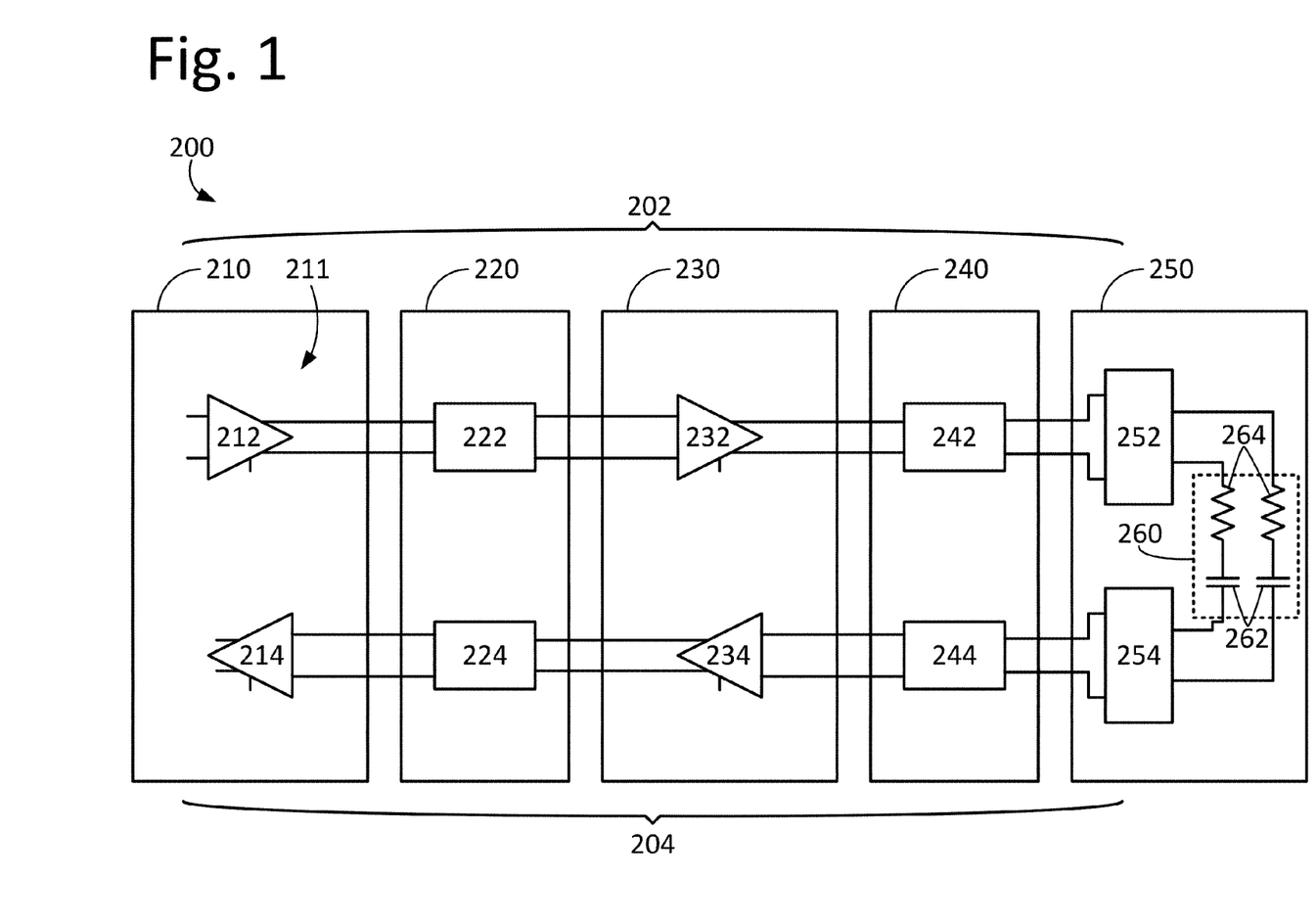
FIG. 1 is a schematic block diagram of an exemplary system for use in determining communication path latency in a dual path device.
Figure 2:
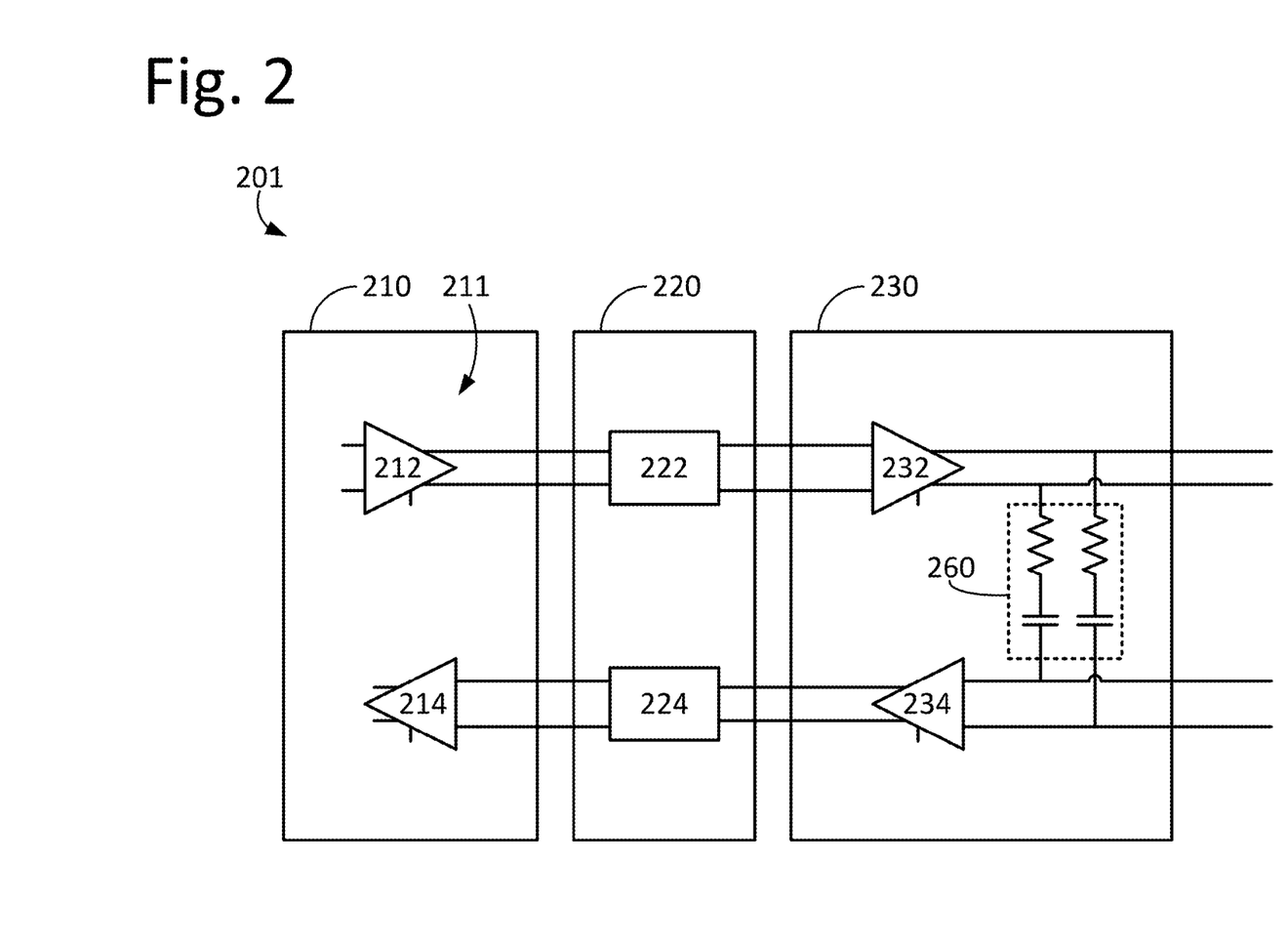
FIG. 2 is a schematic block diagram of an exemplary system for use in determining communication path latency in a storage device including coupling circuitry located in a preamplifier.
Figure 3:
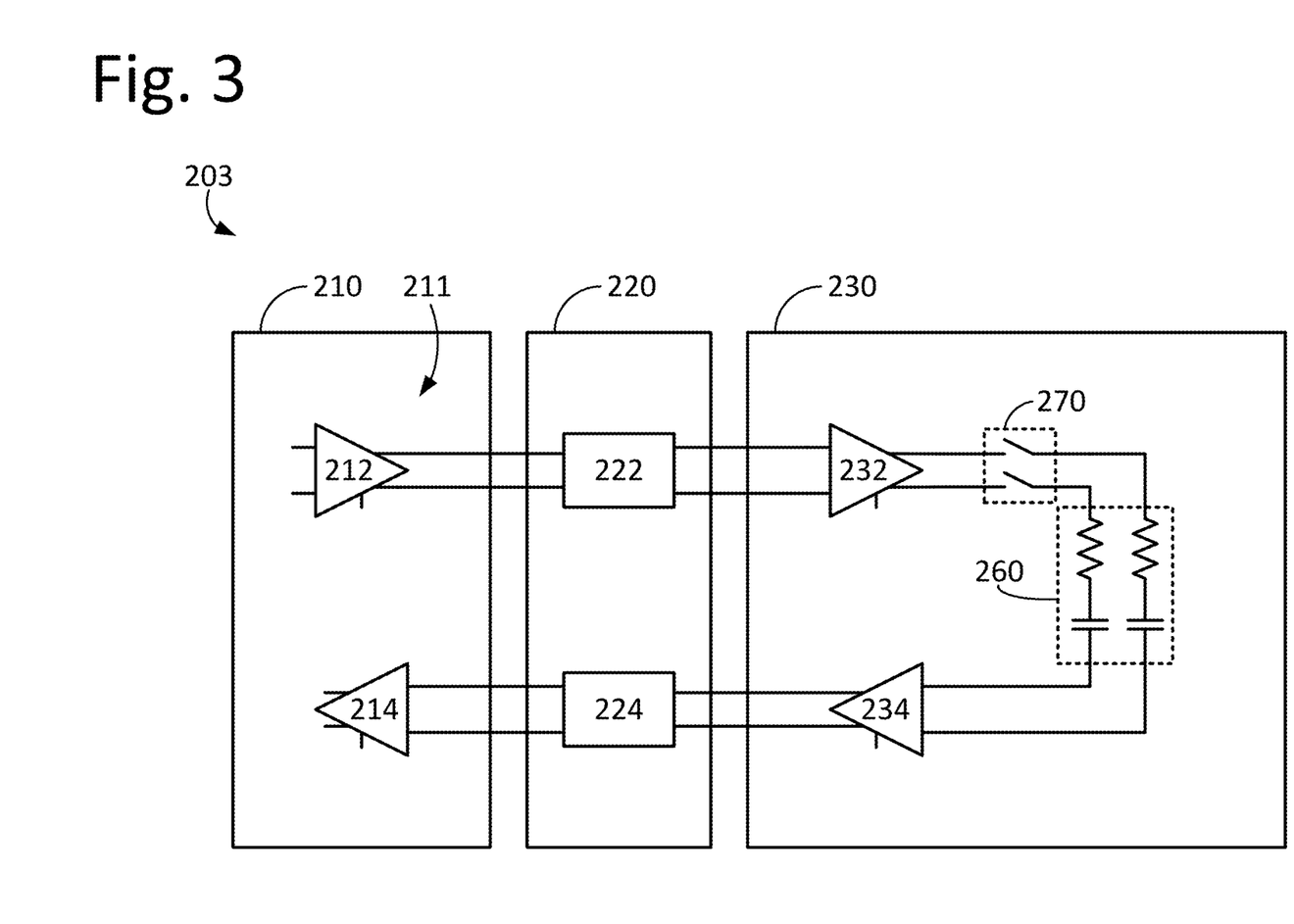
FIG. 3 is a schematic block diagram of another exemplary system for use in determining communication path latency in a storage device including coupling circuitry located in a preamplifier.

An exemplary system 200 for use in measuring latency in an electronic device (e.g., a storage device) is depicted in FIG. 1. The exemplary system 200 includes a controller 210, a flexible circuit and printed circuit board 220, a preamplifier 230, an interconnect portion 240, and a data communication component such as, e.g., a head 250. Further, a write data path 202 (or outbound path) and a read data path 204 (or inbound path) may be defined as extending through each of the controller 210, the flexible circuit and printed circuit board 220, the preamplifier 230, the interconnect portion 240, and the head 250. Each of the write data path 202 and the read data path 204 may include two electrical conductors/connections to complete a circuit from the controller 210 to a write transducer 252 and a read transducer 254, respectively.

The write data path 202 may be used to write data to a storage medium or otherwise transmit communication to a downstream system. For example, write data may be received by the controller 210 and transmitted from the controller 210 along the write data path 202 (e.g., through the flexible circuit and printed circuit board 220, the preamplifier 230, and the interconnection portion 240) to the head 250 to be written to a storage medium using the write transducer 252 located in the head 250. Likewise, read data may be read by the read transducer 254 located in the head 250 and transmitted along the read data path 204 (e.g., through the interconnection portion 240, the preamplifier 230, and the flexible circuit and printed circuit board 220) to the controller 210.

Generally, the controller 210 can be a printed circuit board or integrated circuit containing various circuitry, logic, and memory for use in the control of the storage device. The controller 210 may include, amongst other things, a RW channel 211, which generally provides processing of data being read from/written to a storage medium of a storage device as well as other various functions. Although, as depicted, the RW channel 211 is a portion of the controller 210, it is to be understood that the controller 210 and the RW channel 211 may be independent from one another but yet interoperate with one another for the operation of the system 200. Further, it is to be understood that the functions and/or operations of the controller 210 described herein may be performed by the RW channel 211 and/or any other portion of the controller 210, and vice versa.

For example, the RW channel 211 may include a write portion 212 and read portion 214 as depicted. The write portion 212 may be configured to code-modulate write data supplied from other circuitry of the controller 210, to convert the code-modulated write data into a write data signals, and to transmit the write data signals onto the write path 202. The read portion 214 may be configured to amplify a read data signals that are supplied on the read data path 204 so that they will have certain amplitudes, to extract data from the acquired read signal data signals, and to perform decoding processing.

In one or more embodiments, the controller 210 and/or RW channel 211 may also include various circuitry and/or apparatus that may be used to determine, or measure, the latency in a communication path which may include at least a portion of each of the write data path 202 and the read data path 204 as further described herein. In at least one embodiment, the controller 210 and/or RW channel 211 may include a phase estimation circuit configured to measure the latency of the write data path and the read data path.

The flexible circuit and printed circuit board 220 may include circuitry 222, 224 for the transmission of write data signals and read data signals along the write data path 202 and read data path 204, respectively. Generally, the preamplifier 230 may be configured to amplify write data signals transmitted along the write data path 202 and read data signals transmitted along the read data path 204 (e.g. using amplification circuitry, which may be included in the preamplifier 230). The preamplifier 230 may be configured to amplify write signals transmitted to the head 250 along the write data path 202 using amplifier 232 (e.g., exemplary amplification circuitry) during a write operation and to amplify read signals transmitted from the head 250 along the read path 204 generated by the head 250 using amplifier 234 during a read operation. In at least one embodiment, the preamplifier 230 may be part of the flexible circuit and printed circuit board 220. In other words, the flexible circuit and printed circuit board 220 may include the preamplifier 230, and vice versa The interconnection portion 240 connects, or couples, the preamplifier 230 to the head 250. More specifically, the interconnection portion 240 connects the write data path 202 from the preamplifier 230 to the head 250 and the read data path from the head 250 to the preamplifier 230. For example, as shown, the interconnection portion 240 includes circuitry 242, 244 for the transmission of write data signals and read data signals along the write data path 202 and read data path 204, respectively.

The exemplary system 200 is configured to measure latency of a communication path including at least a portion of each of the write data path 202 and the read data path 204. To measure the latency, the exemplary system 200 may be configured to couple the write data path 202 and the read data path 204 using coupling circuitry 260 located in the head 250. More specifically, a latency measurement signal may be driven on the write data path 202 and the coupling circuitry 260 transmit at least a portion of the latency measurement signal to the read data path 204 where it may be sensed and used to determine latency of the communication path. In other words, the coupling circuitry 260 may be described as allowing at least a portion of a latency measurement signal to be transmitted from the write path 202 to the read path 204 such that it may be used to measure latency of the write data path 202 and the read data path 204. Although the coupling circuitry 260 depicted in FIG. 1 is coupled to the write transducer 252 after the write path 202 is coupled to the write transducer, and likewise, to the read transducer 254 after the read path 204 is coupled to the read transducer 254, the coupling circuitry 260 may merely be described as being coupled to the write data path 202 in parallel with the write transducer 252 and to the read data path 204 in parallel with the read transducer 254.

In at least the depicted embodiment, the coupling circuitry 260 includes a capacitor 262 and resistor 264, each of which may be selected to perform the coupling functionality of the coupling circuitry 260. For example, the capacitor 262 and the resistor 264 may be configured, or provided, to allow one or more components, or portions, of a signal (e.g., a latency measurement signal) to be transmitted from the write path 202 to the read path 204 to be used to measure latency of the write data path 202 and the read data path 204. In at least one embodiment, the capacitor 262 and the resistor 264 may be selected and configured so as to only allow high frequency components to be transmitted from the write data path 202 to the read data path 204. Such high frequency components may be referred to as the AC, or alternating current, components of the signal. Further, the capacitor 262 and resistor 264 may be selected and configured so as to filter, or remove, the low frequency components. Such low frequency components may be referred to as the DC, or direct current, components of a signal. In essence, the coupling circuitry 260 (e.g., the capacitor 262 and the resistor 264) may be configured to allow AC components but disallow (e.g., not allow, filter out, etc.) DC components of a signal to be transmitted from the write data path 202 to the read data path 204. As such, the coupling circuitry 260 described herein may be described as providing "AC loop-back connectivity" (e.g., opposed to DC loop-back connectivity).

DC loop-back connectivity between the write and read specific blocks, in the slider or preamp, may only properly work for systems with a common mode for read transducers close to 0V (or ground) as opposed to systems that use asymmetrical power supplies. For example, if the common mode of the selected write head was +1V and the +1V was presented to the read head (e.g., using DC loop-back connectivity), it may create reliability issues, undesirable connectivity between the read head bias circuits and the write head and/or between the write current and the read head, and/or recovery time deterioration at transitions from write to read modes.

As used herein, AC components of a signal may be defined as components having a frequency great than about 10 megahertz (MHz) and/or less than or equal to about 50 MHz. Further, as used herein, DC components of a signal may be defined as components having a frequency less than about 10 MHz.

Using such exemplary configurations, the coupling circuitry 260 will not affect the typical write operations of the write data path 202 and typical read operations of the read data path 204. In other words, although the coupling circuitry 260 capacitively couples the write data path 202 to the read data path 204, the coupling circuitry 260 does not adversely affect the normal write and read operations (e.g., normal write while read processes are not impacted because there is no write processes occurring at same time as read processes).

The controller 210 may be configured to drive, or provide, a latency measurement signal on the write path 202. Generally, the latency measurement signal is driven on the write path 202 such that the latency signal transmits from the controller 210 along the write path 202 to the head 250, through the coupling circuitry 260 (e.g., at least the AC components of the latency measurement signal), and from head 250 along the read path 204 back to the controller 210 (e.g., the RW channel 211). The latency measurement signal may be any signal capable of being transmitted through the coupling circuitry 260 capacitively coupling the write data path 202 and the read data path 204 and further capable of being used to measure latency in the communication path (e.g., at least a portion of each of the write data path 202 and read data path 204).

In at least one embodiment, the latency measurement signal is square wave having a selected period and a selected phase. For example, the selected period may be greater than or equal to about double the expected delay of the combined write and read paths.

One topic that is known to those skilled in the field is that, for read transducers with a high resistance, the preamp reader sensing circuits are based on a current sensing technique, and therefore present low input impedance. For such analog frontend schemes, adding a resistor in parallel to the read transducer may create an additional thermal noise component proportional to ¼ KTR, where R is the added resistor, K is the Boltzmann constant, and T is temperature (e.g., in Kelvin).

In at least one embodiment, the resistor 264 may be configured to behave as a bias-shunt resistor to decrease resistance of the read transducer 254, or read sensor, of the head 250. More specifically, for example, if the resistor 264 is labeled "Rs" and the capacitor 262 with "Cs," above the frequency for which the capacitors behave like a short, the read transducer (e.g., for high frequency, or AC, components) will see the series combination of the resistor 264 and the capacitor 262 as two Rs resistors. Therefore, the smaller the 2×Rs value is, the higher the thermal noise added into the read path.

To address this issue, existing bias-shunt resistors (e.g., in present storage devices) may be replaced by the two resistors 264 and two capacitors 262 having values chosen such that 2×Rs max greater than or equal to the bias-shunt resistor value. For example, a bias-shunt resistor can be configured to tighten or lessen the read head resistance distribution seen by the preamplifier.

Since the preamp read head bias circuits may be able to handle the entire read head resistance distribution with good noise performance, then the capacitive coupling circuitry 260 in the head 250 described herein could be implemented with the same head noise contribution as the presently-produced heads employing bias-shunt resistors. An example of gain and input referred noise for a real preamplifier 230 analog frontend and interconnection portion 240 loaded with a read transducer having RMR of 390 ohms is shown by line 800 in FIGS. 7-8. The contribution from a 1 kiloohm bias-shunt resistor located in the head 250 is shown by line 801. The contribution from the exemplary coupling circuitry 260 when located in the head 250, where the resistor 264 has a resistance of 500 ohms and the capacitor 262 has a capacitance of 50 picofarads, is shown by line 802. As shown, in this example, the use of AC loop-back connectivity does not add any significant noise deterioration to the read path performance. For example, the contribution of the exemplary coupling circuitry 260 as shown by line 802 is no worse than the contribution from a bias shunt resistor shown by line 801.

The coupling circuitry 260 may be further configured (e.g., the components such as the capacitor 262 and the resistor 264 may be selected, provided, and/or arranged) to reduce interference components from reflections and local couplings when signals (e.g., latency measurement signals, write signals, etc.) are driven on the write path 202. Further, the circuitry of the interconnect portion 240 may also be configured to reduce interference components from reflections and local couplings. The reduction of interference components may guarantee detection margin by keeping the interference components from reflections or local coupling sufficiently far away from the zero crossings of the analog read-back data.

Voltage pulses coupled from the write data path 202 to the read data path 204 using the coupling circuitry 260, and therefore the read transducer 254, could be detrimental to the life span of the read transducer 254. To limit the impact of the coupling circuitry 260 configured to capacitively couple the write data path 202 to the read data path 204, the electrical latency measurements may be made without any read transducer bias, e.g., with the preamp (e.g., read amplifier 234) in a Read While Write operating mode. Under these conditions, the coupled voltage (e.g., the AC, or high frequency, components of a latency measurement signal) across the read transducer 254 may be acceptable, e.g., from a reliability perspective. In essence, the controller 210 may be configured to set a read transducer 254, or sensor, bias to zero when driving a latency measurement signal on the write data path 202 to measure latency.

Further, since the coupling circuitry 260 capacitively couples the write data path 202 to the read data path 204, and therefore, does not allow (e.g., filter out) DC components, a common mode of a write transducer such as e.g., +1V, would not be presented to the read transducer, which may alleviate concerns related to electrical discharges between the disk and the read transducer as well as any undesirable connectivity between the read head bias circuits and the write head and/or between the write current and the read head, and/or recovery time deterioration at transitions from write to read modes.

The slope, or change, in the latency of the write data path 202 and the read data path 204, or communication path, (e.g., in response to environmental conditions) may also be determined without measuring the actual, or absolute, delay, or latency, along the entire write and read data paths 202, 204. For example, although the coupling circuitry 260 is located in the head 250 in the exemplary system 200 depicted in FIG. 1, the coupling circuitry 260 may be located at other places along the write data path 202 and the read data path 204. For example, as shown in the exemplary system 201 depicted in FIG. 2, the coupling circuitry 260 may be located in the preamplifier 230, and the write data path 202 may be capacitively coupled to the read data path 204 in the preamplifier using the coupling circuitry 260. In such a configuration, although a latency measurement signal would not travel, or be transmitted, along the entire communication path, the change, or slope, in the latency may be determined by comparing a presently measurement latency to one or more previously measured latencies, which may provide the latency measurements used by the system 201. In other words, although the actual latency of the entire write data path 202 and the entire read path 204 was not measured (e.g., because the latency measurement signal was not transmitted through the entire write data path 202 and the entire read data path 204), the latency measured may be representative of, or proportional to, the latency of the entire communication including each of the write data path 202 and the read data path 204. Since the latency measured is representative of, or proportional to, the latency of the entire communication, the latency of the entire communication path may be determined.

As described herein, voltage pulses coupled from the write data path 202 to the read data path 204, and therefore the read transducer 254, could be detrimental to the life span of the read transducer 254. When the coupling circuitry 260 is located in the preamplifier 230, one could preserve the functionality of the Read While Writing operating mode of the preamplifier 230 for head stability testing by disconnecting the connectivity from the write transducer 252 to the read data path 204 via switching apparatus 270 (e.g., a switch for each conductor/connection of the write data path 204) as shown in exemplary system 203 depicted in FIG. 3. Although not shown, the controller 210, the RW channel 211, the flexible circuitry and printed circuit board 220, and/or the preamplifier 230 may include additional circuitry, traces, and/or logic configured to provide the functionality of the switching apparatus 270 (e.g., to open or close the switches). In other words, the controller 210 may be configured to open and close the switching apparatus 270 to directly connect the coupling circuitry 260 to the write data path 202.

Figure 4:
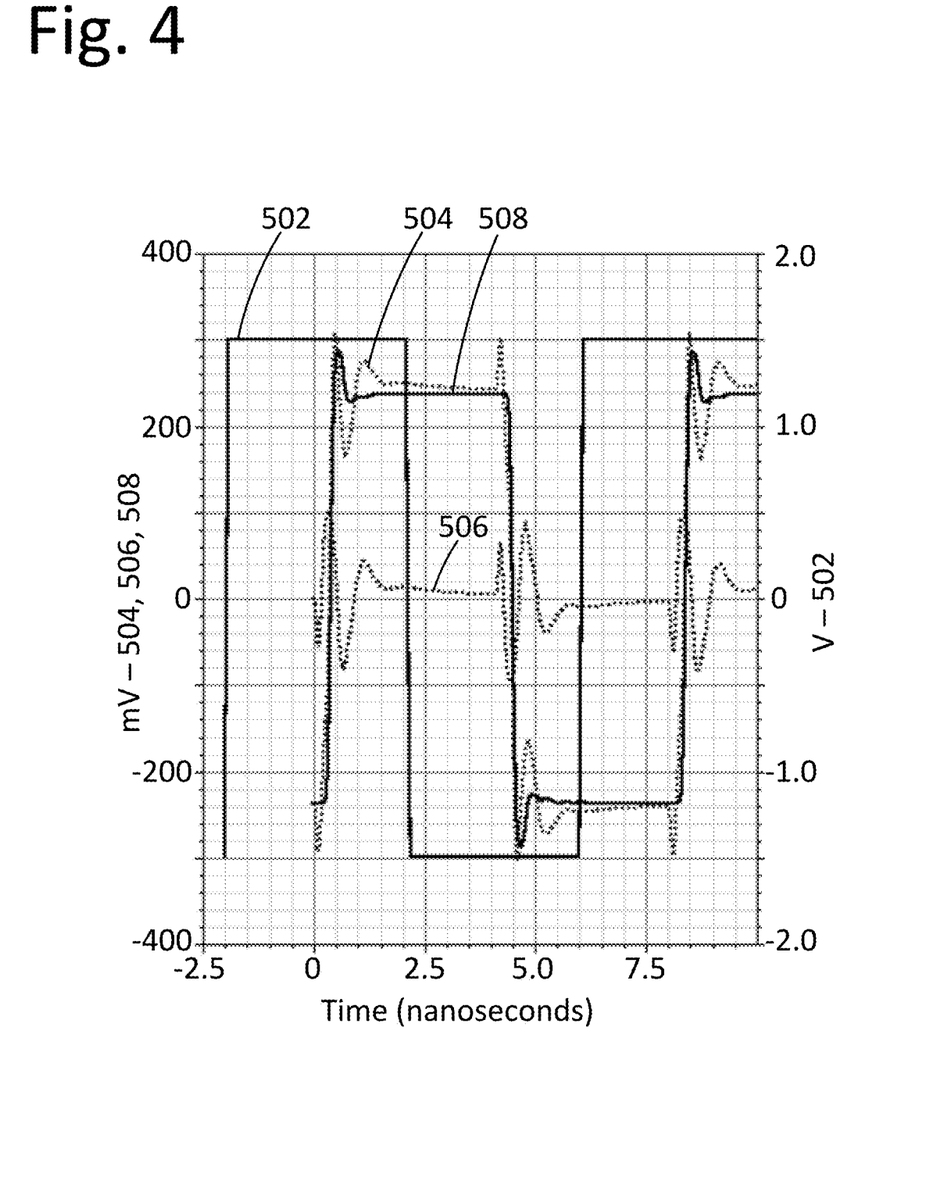
FIG. 4 is a graph depicting a latency measurement signal driven on a write data path, the latency measurement signal received on a read data path, and the reflections and local couplings in a system.

A latency measurement signal used in an exemplary DC loop-back system is depicted in FIG. 4. In this example, the latency measurement signal is a square wave driven in the write data path as shown by line 502. The latency measurement signal received in the read data path is shown by line 504 and the reflections and local couplings are shown by line 506. Line 508 depicts the latency measurement signal with the interference (e.g., line 506) removed, e.g., using a trained canceller.

Figure 5:
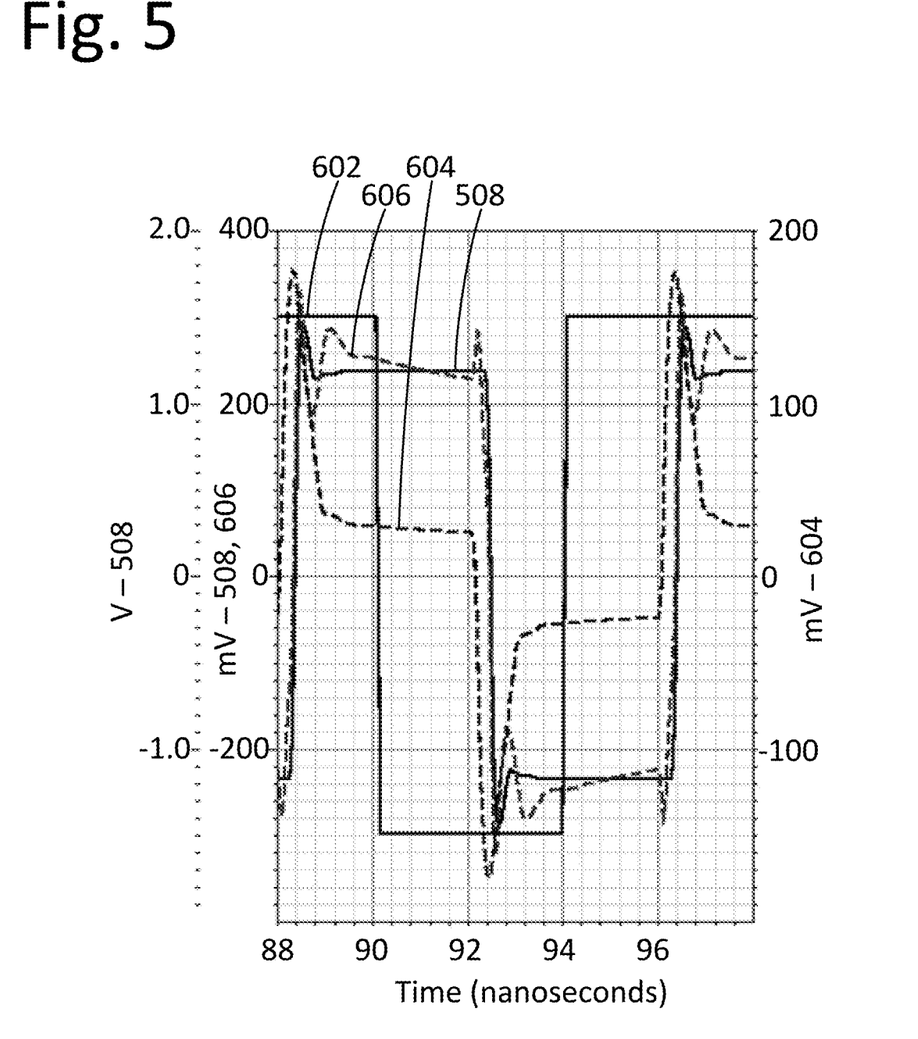
FIG. 5 is a graph depicting a latency measurement signal driven on a write data path, the latency measurement signal received on a read data path in an exemplary system using coupling circuitry located in a preamplifier, and the latency measurement signal received on a read data path in an exemplary system using coupling circuitry located in a head.

A latency measurement signal in the exemplary systems described herein is depicted in FIG. 5. In this example, the latency measurement signal is a square wave driven in the write data path as shown by line 602. The latency measurement signal received in the read data path in an exemplary system where the coupling circuitry located in the head (e.g., the exemplary system 200 of FIG. 1) is shown by line 606, and the latency measurement signal received in the read data path in an exemplary system where the coupling circuit is located in the preamplifier (e.g., the exemplary system 201 of FIG. 2) is shown by line 604. Line 508 depicts the latency measurement signal from an exemplary DC loop-back system with the interference removed shown in FIG. 4 (for comparison purposes).

As shown in FIG. 5, the delay between the latency measurement signal driven on the write path 602 and the latency measurement signals 604, 606 received could be extracted from the zero crossings of the analog waveforms (e.g., the point at which the signals cross 0 voltage). For example, the time period between the zero crossing of signal 602 (e.g., which may be used as a reference signal) and one of signal 604, 606 (e.g., the sensed, returned signals) may be the latency. In other words, in at least one embodiment, a sensed latency measurement signal may be compared to a reference signal (e.g., using the controller 210 and/or RW channel 211). Further, in at least one embodiment, comparing the sensed latency measurement signal to a reference signal may include comparing the zero crossings of the sensed latency measurement signal and the reference signal. Further, for example, a phase estimation circuit (e.g., of the controller 210 and/or RW channel 211) may be configured to measure the latency of the write data path and the read data path.

Figure 6:
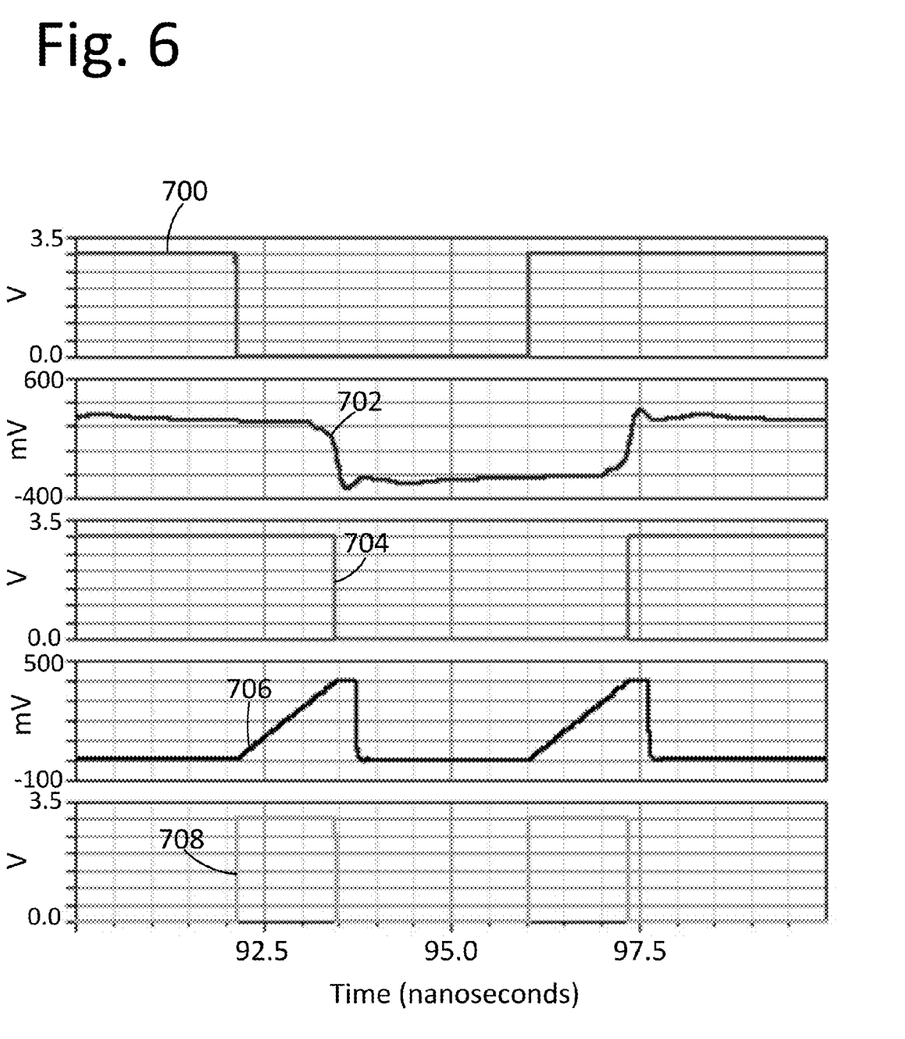
FIG. 6 includes multiple graphs depicting an exemplary method of determining communication path latency.
Figure 7:
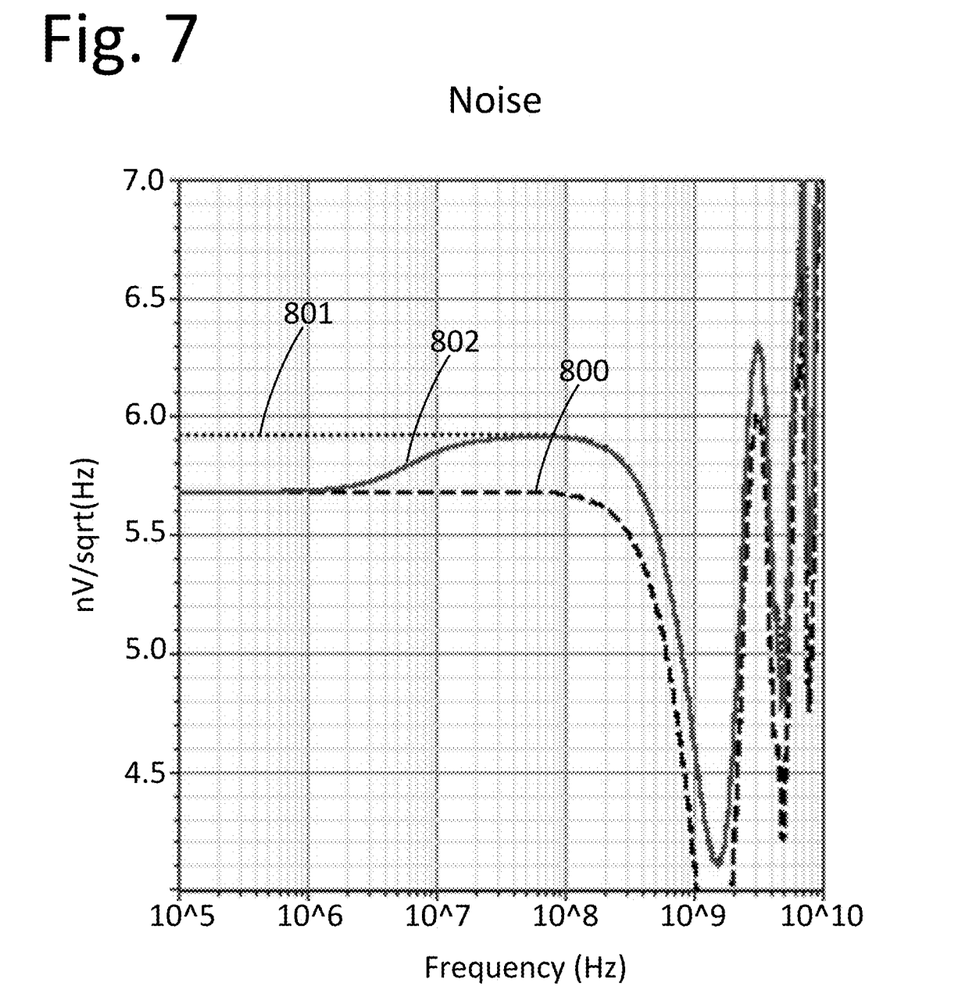
FIGS. 7-8 are graphs depicting gain and input-referred noise in an exemplary system.
Figure 8:
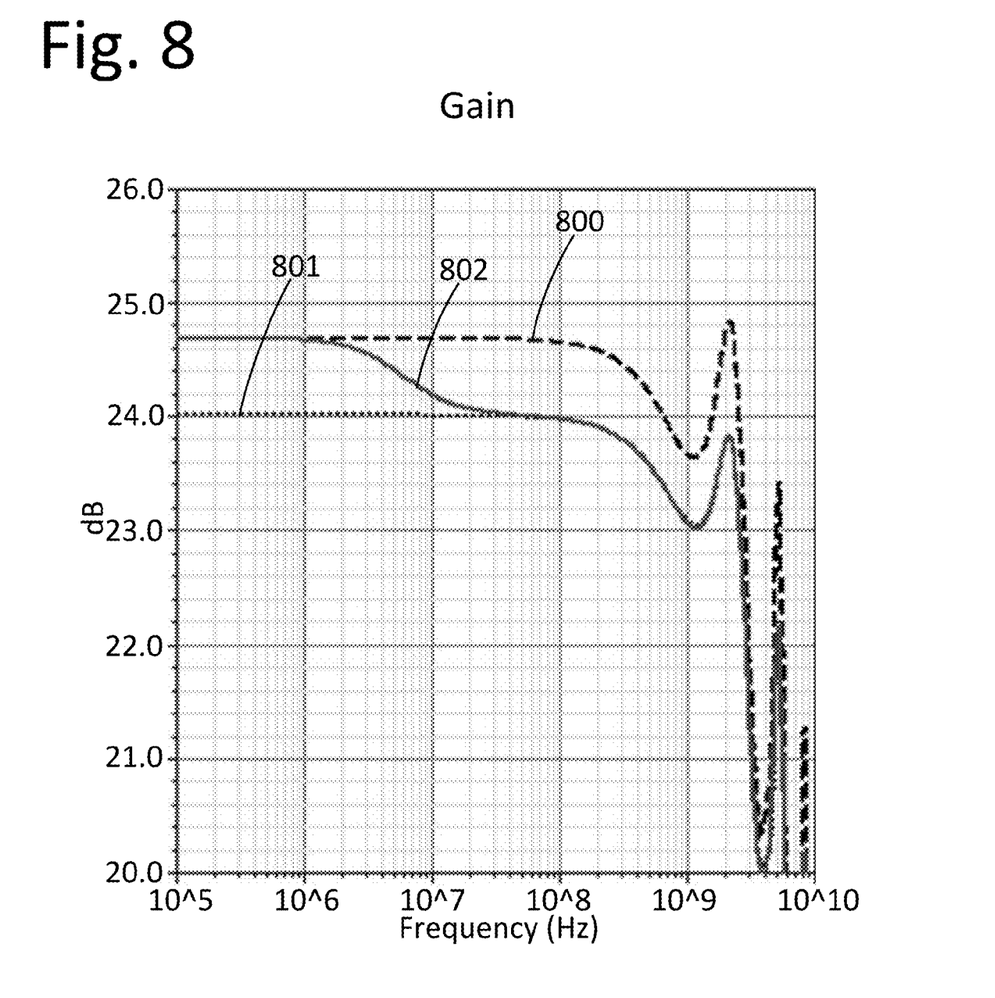

An exemplary method for use in determining, or measuring, communication path latency is depicted in FIG. 6. A square wave 700, which is the latency measurement signal in this example, may be driven, or transmitted, on the write path, and a return signal 702 may be sensed, or received, on the read path (representative of the square wave 700 after being transmitted through the communication path). A return square wave 704 may be generated based on the return signal 702, and a delay signal 706 may be generated using the slope of the exclusive disjunction, or XOR, of the square wave 700 and the return square wave 704. Further, delay pulses 708 may be generated representative of the measured latency, or delay, which may be used by the storage systems and methods for storage operations (e.g., the amplitude of the signal 706 is equivalent to the time delay pulses 708, which could be measured, digitized, and returned to a controller as a time value representing the electrical latency measured).

Figure 9:
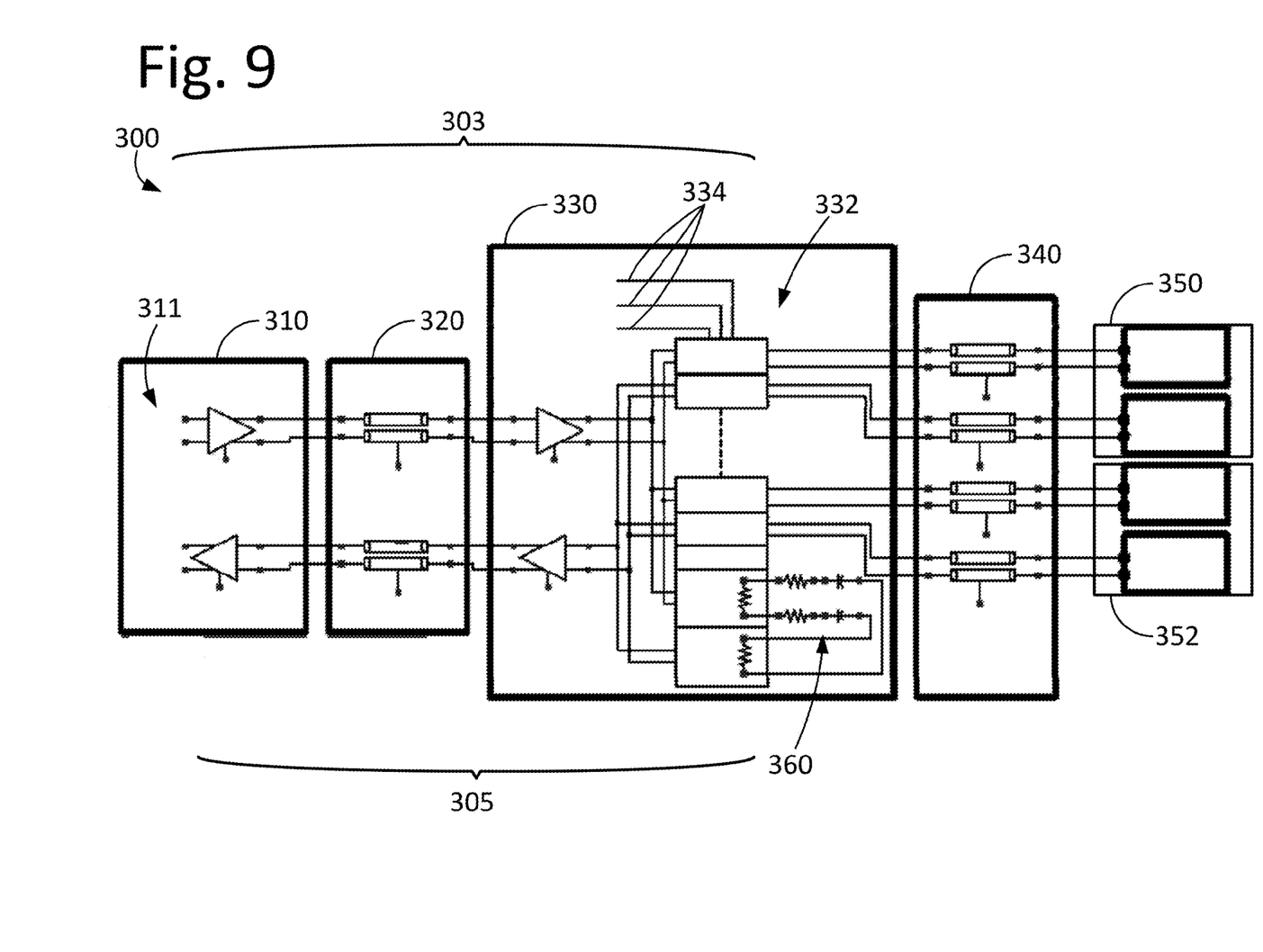
FIG. 9 is schematic block diagram of an exemplary configuration of coupling circuitry located in a preamplifier for use in determining communication path latency in a storage device.

Another exemplary system 300 for use in measuring latency in a storage device is depicted in FIG. 9. The exemplary system 300 includes a controller 310, RW channel 311, a flexible circuit and printed circuit board 320, a preamplifier 330, an interconnect portion 340, and a plurality of heads 350, 352 (e.g., although only two heads are depicted, the exemplary systems described herein may include more than two heads such as 3 or more heads, 4 or more heads, 6 or more heads, 8 or more heads, 10 or more, etc.).

Similar to system 200 described herein with reference to FIG. 1, a write data path and a read data path may be defined as extending through each of the controller 310, the flexible circuit and printed circuit board 320, the preamplifier 330, the interconnect portion 340, and the heads 350, 352. Further, each of the write data path and the read data path may include two electrical paths to complete a circuit from the controller 310 to a write transducer and a read transducer of a head 350, 352, respectively.

As shown, the preamplifier 330 may be electrically coupled to the controller 310 by, or using, only one write data path and one read data path, which each of the write transducers and read transducers may, respectively, share (when writing and reading data from a storage medium). In essence, the data paths between the preamplifier 330 and the controller 310 may be referred to as a common write data path 303 and a common read data path 305 data paths since, e.g., each write transducer can use the same common write data path 303 between the preamplifier 330 and the controller 310 and each read transducer can use the same common read data path 305 between the preamplifier 330 and the controller 310.

In systems using such common write and read path configurations, the preamplifier 330 may include multiplexing circuitry 332 (e.g., a switching portion, a switch, a multiplexing portion, etc.) operable, or configured, to selectively electrically couple the common write data path 303 to a write data path of a write transducer of a head, and to selectively electrically couple the common read data path to a read data path of a read transducer of a head. In other words, the multiplexing circuitry 332 may be configured to selectively electrically couple the common write data path 303 to a write data path of one of the heads 350, 352 and to selectively electrically couple the common read data path 305 to a read data path of one of the heads 350, 352.

The multiplexing circuitry 332 may be electrically coupled (e.g., operably coupled) to the controller 310 (as represented by lines 334) such that the controller 310 can control the coupling of the common write and read data paths 303, 305 to the transducers of the heads 350, 352. In other words, the controller 310 can selectively couple the common write and read data paths 303, 305 to the transducers of the heads 350, 352 using the multiplexing circuitry 332.

The preamplifier 330 of the exemplary system 300 may further include coupling circuitry 360 configured to capacitively couple the common write data path 303 to the common read data path 305 for use in latency measurement of a communication path including the common write data path 303 to the common read data path 305 using the same methods as described herein. As shown, the multiplexing circuitry 332 may be configured to selectively electrically couple the coupling circuitry 360 to the common write data path 303 and the common read data path 305. For example, when the controller 310 initiates a latency measurement, the controller 310 may use the multiplexing circuitry 332 to select the coupling of the coupling circuitry 360 to the common write data path 303 and the common read data path 305.

In other words, the preamplifier 330 of the exemplary system 300 includes coupling circuitry 360 that may be selected to be coupled, using the multiplexing circuitry 332, to the common write and read data paths 303, 305. In other embodiments, instead of needing to be selected, the coupling circuitry 360 may be provided in the preamplifier 330 for the write and read data paths for each head 350, 352.

Figure 10:
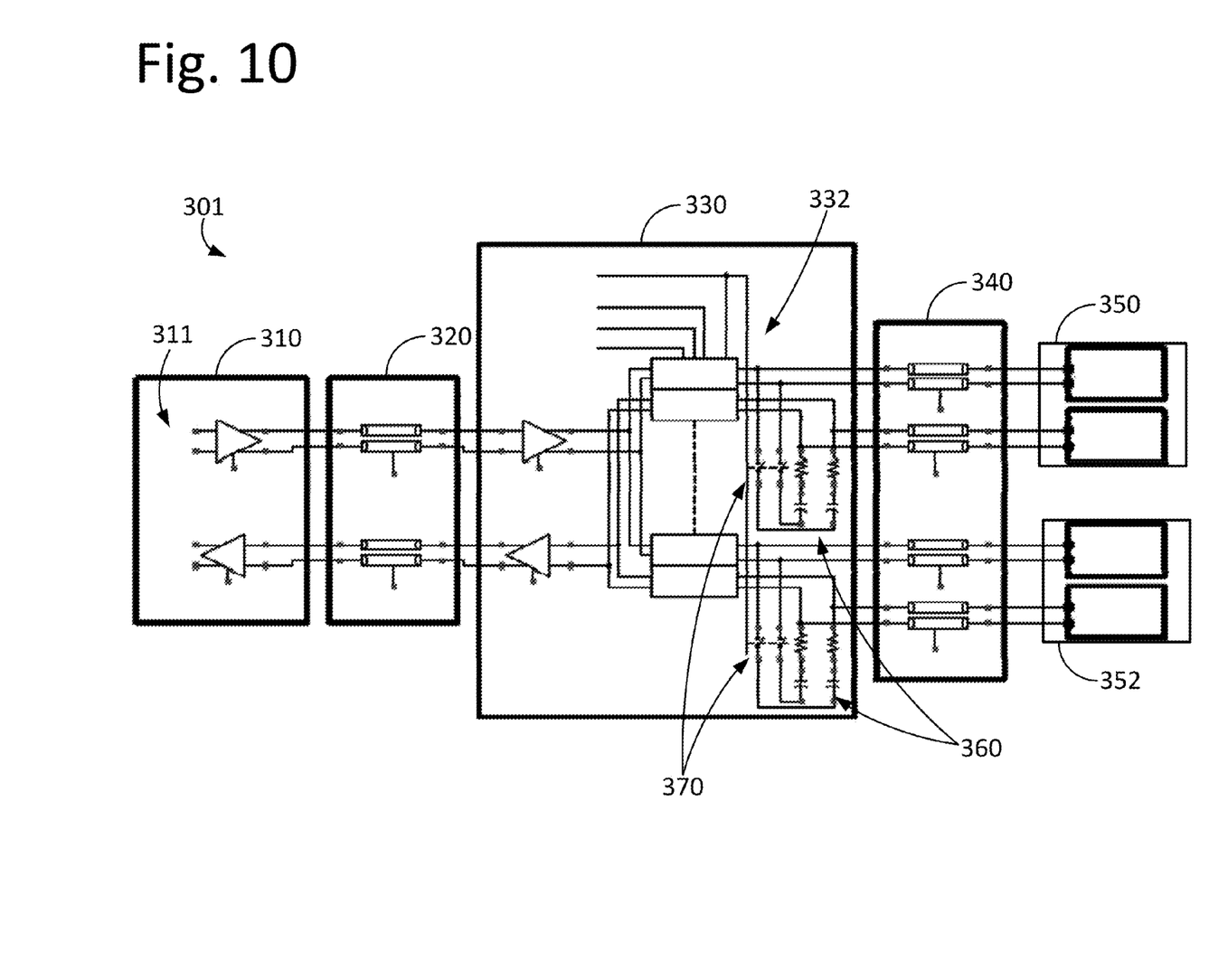
FIG. 10 is schematic block diagram of another exemplary configuration of coupling circuitry located in a preamplifier for use in determining communication path latency in a storage device.

For example, the exemplary system 301 depicted in FIG. 10 includes a preamplifier 330 including coupling circuitry 360 configured to couple the write and read data paths for each head 350, 352. Similar to the preamplifier 330 of exemplary system 300, the preamplifier 330 of exemplary system 301 may include multiplexing circuitry 332 that operates in a similar manner. In this embodiment, however, each selectable data path from the preamplifier 330 to a head 350, 352 may include coupling circuitry 360, and therefore, the multiplexing circuitry 332 may not be needed to be used to selectively couple the latency measurement circuitry 360 to the common write and read data paths 303, 305. Instead, any of the write and read data paths of the heads 350, 352, or any other heads 350, 352, may be selected using the multiplexing circuitry 332 when measuring latency (e.g., driving a latency measurement signal on the common write data path 303 and sensing the latency measurement signal on the common read data path 305). The exemplary system 301 may further include switching apparatus 370 for each of the sets of latency measurement circuitry 360, which may be similar to the switching apparatus 270 as shown in exemplary system 203 depicted in FIG. 3 (e.g., for connecting or disconnecting the coupling circuitry from the respective data paths).

The methods and/or techniques described in this disclosure, including those attributed to the HDD controller, or various constituent components, may be implemented, at least in part, in hardware, software, firmware, or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in programmers, such as physician or patient programmers, stimulators, image processing devices, or other devices. The term "controller," "module," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above", "below", etc. may be used in this disclosure. These terms should not be construed as limiting the position or orientation of a structure, but should be used as providing spatial relationship between the structures.

Embodiments of the systems, apparatus, and methods for measuring latency in a storage device are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A system for measuring latency comprising:
    a head configured to write and read data on a storage medium;
    a controller configured to write and read data using the head;
    a write data path electrically coupling the controller to the head for transmission of write data signals;
    a read data path electrically coupling the controller to the head for transmission of read data signals; and
    coupling circuitry configured to capacitively couple the write data path and the read data path,
    the controller configured to determine a latency of a communication path comprising at least a portion of each of the write data path and the read data path using at least a latency measurement signal driven on the write data path.

2. The system of claim 1, wherein the head is further configured to operate in at least one of a bit-patterned media system or a heat-assisted magnetic recording system.

3. The system of claim 1, wherein the coupling circuitry is located in the head.

4. The system of claim 3, wherein the coupling circuitry comprises a resistor configured to behave as a bias-shunt resistor to decrease resistance of a read transducer of the head during reading of data from the storage medium using the read transducer.

5. The system of claim 1, wherein the controller is configured to set a read transducer bias of the read data path to zero when driving a latency measurement signal on the write data path.

6. The system of claim 1, wherein the coupling circuitry comprises a capacitor and a resistor configured to reduce interference components from reflections and local couplings when a latency measurement signal is driven on the write data path.

7. The system of claim 1, wherein the system further comprises a preamplifier located between the controller and the head, wherein the preamplifier is configured to amplify the write data signals transmitted along the write data path and the read data signals transmitted along the read data path, and wherein the coupling circuitry is located in the preamplifier.

8. The system of claim 7, wherein the coupling circuitry comprises a capacitor and a switch, the switch configured to selectively couple the capacitor to the write data path when a latency measurement signal is driven on one of the write data path and the read data path.

9. A system comprising:
    a controller configured to write and read data on a storage medium using a plurality of heads;
    a preamplifier located between the controller and the plurality of heads, wherein the preamplifier is configured to amplify the write data signals transmitted from the controller to the plurality of heads and the read data signals transmitted from the plurality of heads to the controller,
    a common write data path electrically coupling the controller to the preamplifier for transmission of write data signals from the controller to the preamplifier;
    a common read data path electrically coupling the controller to the preamplifier for transmission of read data signals from the preamplifier to the controller; and
    coupling circuitry located in the preamplifier configured to capacitively couple the common write data path to the common read data path,
    the controller configured to determine a latency of a communication path comprising at least each of the common write data path and the common read data path using at least the latency measurement signal driven on the common write data path.

10. The system of claim 9, wherein the preamplifier further comprises multiplexing circuitry configured to selectively electrically couple the common write data path to a write data path of one of the plurality of heads and the common read data path to a read data path of one of the plurality of heads, wherein the coupling circuitry is configured to capacitively couple the write data path and the read data path for each head of the plurality of heads.

11. The system of claim 9, wherein the preamplifier further comprises multiplexing circuitry configured to selectively electrically couple the common write data path to a write data path of one of the plurality of heads and the common read data path to a read data path of one of the plurality of heads, wherein the controller is further configured to selectively electrically couple the coupling circuitry to the common write data path and the common read data path.

12. A method for use in measuring latency in an electronic device including a write data path for the transmission of write data signals and a read data path for the transmission of read data signals extending between a controller and a head, the method comprising:
    providing coupling circuitry configured to capacitively couple a write data path to a read data path when a latency measurement signal is driven on the write data path;
    driving a latency measurement signal on the write data path;
    sensing the latency measurement signal on the read data path; and
    determining the latency of a communication path comprising at least a portion of each of the write data path and read data path using at least the sensed latency measurement signal.

13. The method of claim 12, wherein driving a latency measurement signal on the write data path comprises transmitting a square wave on the write data path.

14. The method of claim 12, wherein determining the latency of a communication path comprises comparing the sensed latency measurement signal to a reference signal.

15. The method of claim 14, wherein comparing the sensed latency measurement signal to a reference signal comprises comparing the zero crossings of the sensed latency measurement signal and the reference signal.

16. The method of claim 12, wherein a preamplifier is located between the controller and the head, wherein preamplifier is configured to amplify write data signals transmitted along the write data path and read data signals transmitted along the read data path, and wherein the coupling circuitry is located in the preamplifier.

17. The method of claim 12, wherein the coupling circuitry is configured to filter low frequency components from being transmitted between the write data path and the read data path.

* * * * *